(12) United States Patent
Hosbach et al.

(10) Patent No.: US 10,266,088 B2
(45) Date of Patent: *Apr. 23, 2019

(54) VEHICLE SEATING ASSEMBLY HAVING ABRASION RESISTANT BOLSTER INSERT

(71) Applicant: Ford Global Technologies, LLC, Dearborn, MI (US)

(72) Inventors: Christian J. Hosbach, Taylor, MI (US); Johnathan Andrew Line, Northville, MI (US); Kevin Mozurkewich, Livonia, MI (US); Rodney Charles Brinker, Eastpointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/420,919

(22) Filed: Jan. 31, 2017

(65) Prior Publication Data

US 2018/0215296 A1 Aug. 2, 2018

(51) Int. Cl.
| | |
|---|---|
| *B60N 2/70* | (2006.01) |
| *B60N 2/20* | (2006.01) |
| *B60N 2/58* | (2006.01) |
| *B60N 2/68* | (2006.01) |

(52) U.S. Cl.
CPC ............. *B60N 2/7005* (2013.01); *B60N 2/20* (2013.01); *B60N 2/58* (2013.01); *B60N 2/68* (2013.01)

(58) Field of Classification Search
CPC ...... B60N 2/7005; B60N 2/58; B60N 2/5825; B60N 2/60

USPC ............. 297/440.11, 354.1, 452.29, 452.33, 297/452.34, 284.9
See application file for complete search history.

(56) References Cited

U.S. PATENT DOCUMENTS

| | | | | |
|---|---|---|---|---|
| 4,883,320 A | * | 11/1989 | Izumida | A47C 7/282 297/284.1 |
| 5,407,248 A | * | 4/1995 | Jay | A61G 5/10 297/284.1 |
| 5,441,331 A | | 8/1995 | Vento | |
| 5,934,749 A | * | 8/1999 | Pond | B60N 2/4805 297/188.04 |
| 6,802,563 B1 | * | 10/2004 | Mysliwiec | B60N 2/206 297/284.9 |
| 7,252,341 B2 | * | 8/2007 | Kircher | B60N 2/68 297/452.55 |
| 7,708,343 B2 | * | 5/2010 | Kayumi | B60N 2/99 297/284.9 |
| 9,409,505 B2 | | 8/2016 | Tabbert et al. | |
| 9,707,870 B2 | * | 7/2017 | Line | B60N 2/427 |
| 2003/0222494 A1 | | 12/2003 | Mallery | |
| 2005/0179306 A1 | * | 8/2005 | White | B60N 2/58 297/452.33 |
| 2006/0152062 A1 | * | 7/2006 | Archambault | B60N 2/80 297/452.34 |
| 2006/0170274 A1 | | 8/2006 | Moule | |

(Continued)

*Primary Examiner* — Jose V Chen
(74) *Attorney, Agent, or Firm* — Vichit Chea; Price Heneveld LLP

(57) ABSTRACT

A vehicle seating assembly includes a seatback frame. A bolster insert is positioned on a side bolster of the seatback frame. A foam layer is positioned over the seatback frame. A trim cover is positioned over the foam layer. The foam layer and the trim cover are contoured to expose the bolster insert.

20 Claims, 5 Drawing Sheets

(56) References Cited

U.S. PATENT DOCUMENTS

| | | | | |
|---|---|---|---|---|
| 2006/0250008 A1* | 11/2006 | Kohl | ................... | A47C 7/46 |
| | | | | 297/284.9 |
| 2007/0228792 A1* | 10/2007 | Chen | ................... | B60N 2/2851 |
| | | | | 297/284.9 |
| 2010/0201178 A1* | 8/2010 | Mizobata | ............ | B60N 2/5825 |
| | | | | 297/452.35 |
| 2011/0049949 A1 | 3/2011 | Basmaji et al. | | |
| 2013/0209735 A1 | 8/2013 | Kim et al. | | |
| 2013/0270887 A1* | 10/2013 | Matsumoto | .......... | B60N 2/4228 |
| | | | | 297/452.34 |
| 2014/0361590 A1* | 12/2014 | Line | ................... | B60N 2/0244 |
| | | | | 297/284.9 |

\* cited by examiner

VEHICLE SEATING ASSEMBLY HAVING ABRASION RESISTANT BOLSTER INSERT

FIELD OF THE DISCLOSURE

The present disclosure generally relates to vehicle seating assemblies. More specifically, the present disclosure relates to preventing premature wear to vehicle seating assemblies.

BACKGROUND OF THE INVENTION

Utility belts worn by occupants of vehicle seating assemblies can cause premature wear to the vehicle seating assembly. More specifically, the premature wear can be imparted onto the trim cover and foam layer of the vehicle seating assembly. Occupants that wear utility belts include police officers, construction workers, and contractors, to name a few.

SUMMARY OF THE INVENTION

According to one aspect of the present disclosure, a vehicle seating assembly includes a seat frame and a seatback frame pivotably coupled to the seat frame. A bolster insert is positioned on a side bolster of the seatback frame. The bolster insert operably couples to a front surface of the seatback frame. The bolster insert presents a generally continuous surface to an occupant. A foam layer is positioned over the seat frame and the seatback frame. A trim cover is positioned over the foam layer. The foam layer and the trim cover are contoured to expose the bolster insert when the vehicle seating assembly is fully assembled.

According to another aspect of the present disclosure, a vehicle seating assembly includes a seat frame and a seatback frame pivotably coupled to the seat frame. A bolster insert is positioned on a side bolster of the seatback frame. The bolster insert presents a generally continuous surface to an occupant. A foam layer is positioned over the seatback frame. A trim cover is positioned over the foam layer. The foam layer and the trim cover are contoured to expose the bolster insert.

According to yet another aspect of the present disclosure, a vehicle seating assembly includes a seatback frame. A bolster insert is positioned on a side bolster of the seatback frame. A foam layer is positioned over the seatback frame. A trim cover is positioned over the foam layer. The foam layer and the trim cover are contoured to expose the bolster insert.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
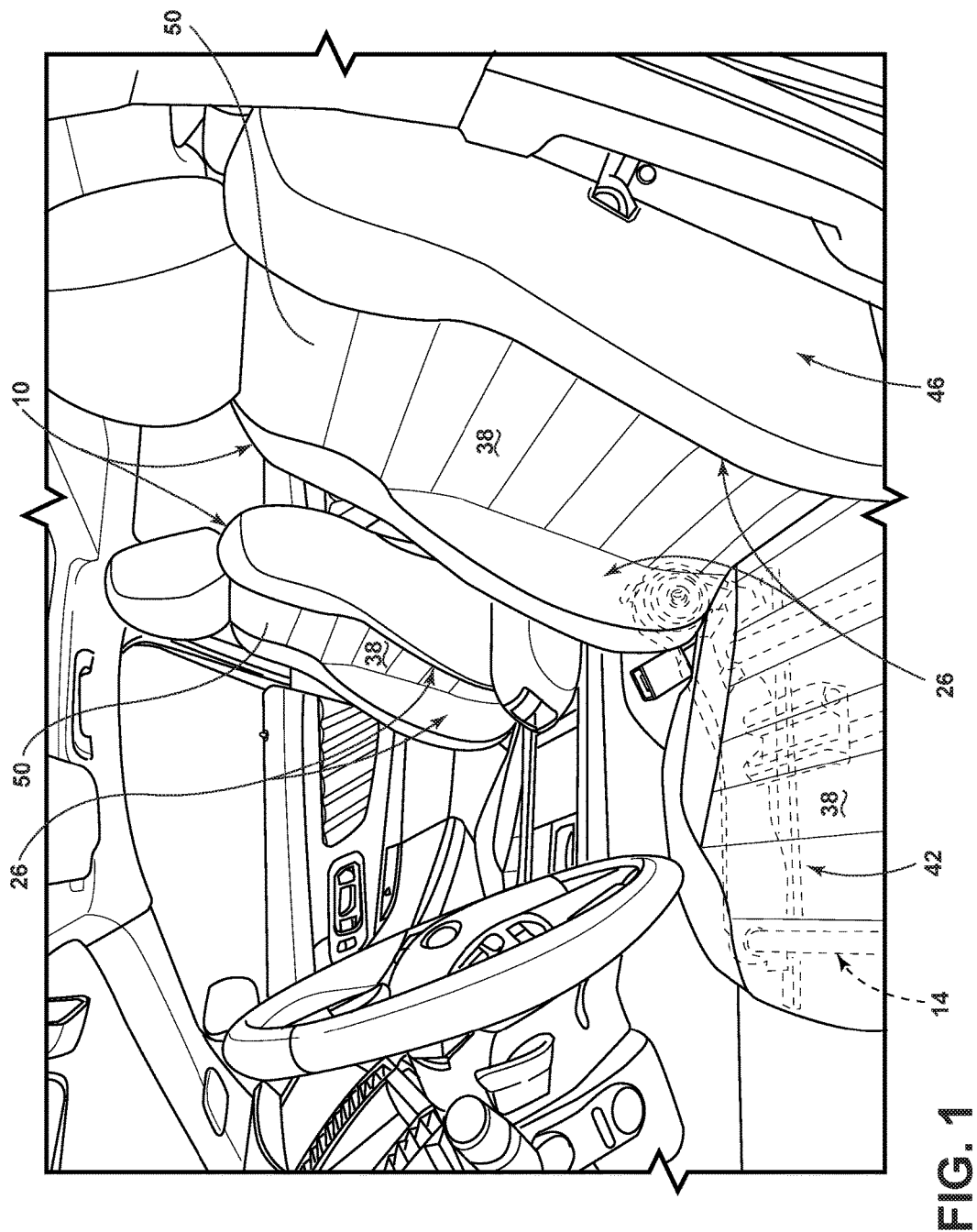
FIG. 1 is a side perspective view of vehicle seating assemblies.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-6, a pair of front row vehicle seating assemblies 10 are illustrated including a seat frame 14 and a seatback frame 18 pivotably coupled to the seat frame 14. A bolster insert 22 is positioned on a side bolster 26 of the seatback frame 18. The bolster insert 22 operably couples to a front surface 30 of the seatback frame 18. The bolster insert 22 presents a generally continuous surface to an occupant. A foam layer 34 is positioned over the seat frame 14 and the seatback frame 18. A trim cover 38 is positioned over the foam layer 34. The foam layer 34 and the trim cover 38 are contoured to expose the bolster insert 22 when fully assembled.

Referring again to FIG. 1, the vehicle seating assembly 10 includes a seat 42 and a seatback 46. The seatback 46 can further include a central region 50 that is flanked on either side by the side bolsters 26. While the side bolsters 26 are shown at a lower portion of the seatback 46 it is contemplated that the side bolsters 26 can be alternatively or additionally positioned at an upper portion of the seatback 46. The lower portion of the seatback 46 is commonly referred to as the lumbar region and the upper portion of the seatback 46 generally supports the shoulders and upper back of an occupant of the vehicle seating assembly 10. It is contemplated that the features and concepts disclosed herein for the vehicle seating assembly 10 can be employed on any or all of the vehicle seating assemblies 10 installed in a vehicle. For example, the features and concepts disclosed herein can be employed in a driver side front seat, a passenger side front seat, a driver side rear seat, a passenger side rear seat, and/or a rear bench seat.

Figure 2:
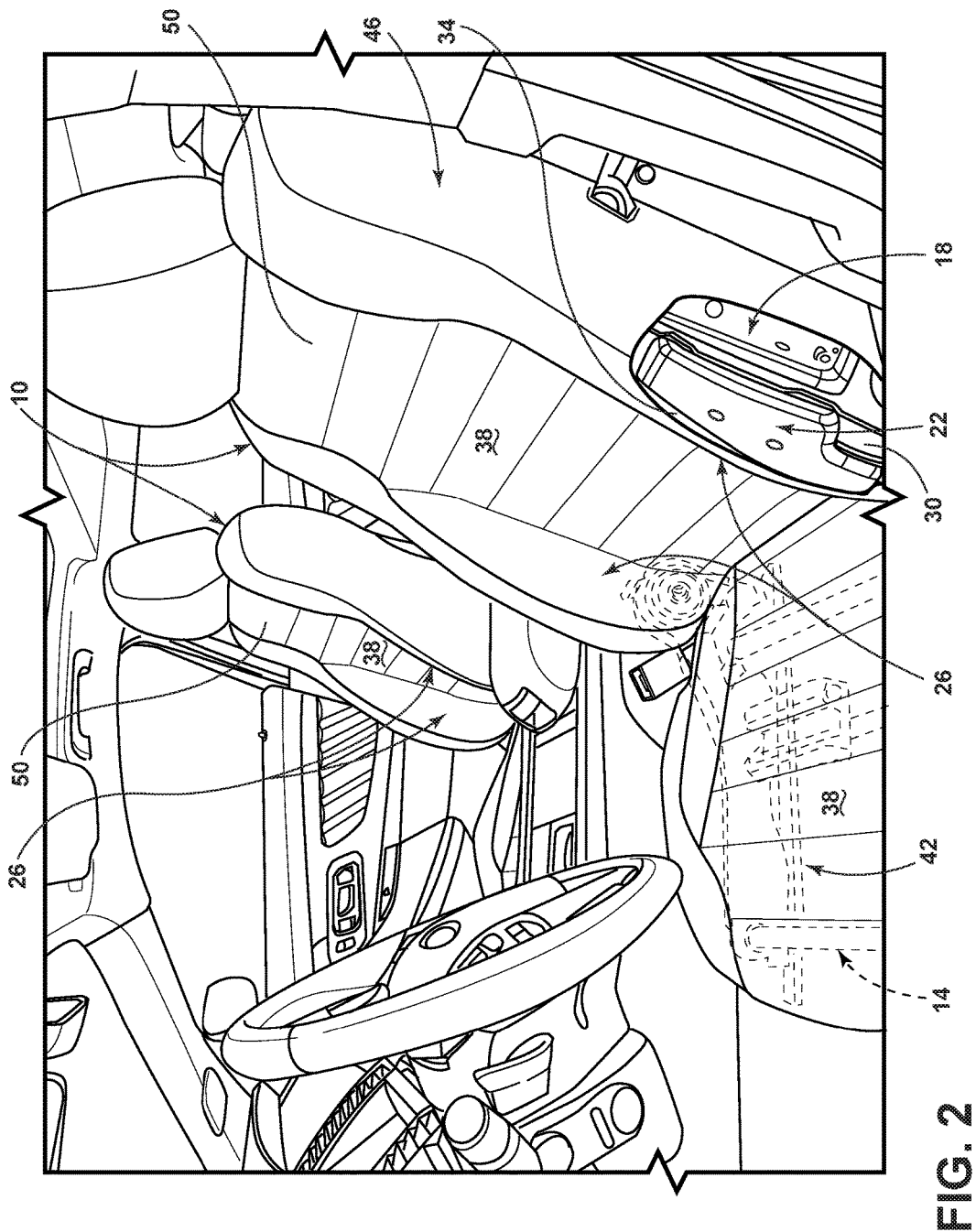
FIG. 2 is a side perspective view of a vehicle seating assembly having an abrasion resistant bolster insert, according to one embodiment.

Referring now to FIG. 2, the vehicle seating assembly 10 is shown with the bolster insert 22 installed. When installed, the bolster insert 22 is positioned at the lower portion of the side bolster 26 of the seatback frame 18. The bolster insert 22 can be operably coupled to the front surface 30 of the seatback frame 18 such that a generally continuous surface is presented to the occupant of the vehicle seating assembly 10. The area of the seatback frame 18 where the bolster insert 22 is installed is generally free of the foam layer 34 and the trim cover 38. In other words, when the bolster insert 22 is installed on the seatback frame 18 the occupant of the vehicle seating assembly 10 is presented with the trim cover 38 in areas of the vehicle seating assembly 10 where the bolster insert 22 is not installed. However, where the bolster insert 22 is installed, the occupant of the vehicle seating assembly 10 is presented with the surface of the bolster insert 22. The transition between the bolster insert 22 and the trim cover 38 can be generally continuous such that the occupant of the vehicle seating assembly 10 is presented with a generally continuous surface of the vehicle seating assembly 10.

Referring again to FIG. 2, a benefit of conventional side bolsters 26 in vehicle seating assemblies 10 is that the occupant of the vehicle seating assembly 10 is provided with lateral support during vehicle maneuvering (e.g. rapid cornering). In order to provide this lateral support, the side bolsters 26 extend forward of the central region 50 of the seatback 46. However, the forward extension of the side bolsters 26 can make ingress and egress more difficult, especially for occupants that wear utility belts while driving. Occupants that wear utility belts may include police officers, construction workers, and contractors, to name a few. In addition to making ingress and egress more difficult the forward extension of the side bolsters 26 can result in premature wear to the trim cover 38 and the foam layer 34 of the vehicle seating assembly 10 due to repeated contact with the utility belt and the items held within the utility belt. Additionally, the added pressure of the side bolsters 26 to the utility belt worn by the occupant can result in added discomfort to the occupant while they occupy the vehicle seating assembly 10. The features and concepts disclosed herein overcome these and other issues while maintaining lateral support for the occupant during vehicle maneuvers. Although the side bolster 26 is shown generally removed from the lower portion of the seatback 46, the side bolster 26 is maintained in the upper portion of the seatback 46. The side bolster 26 at the upper portion of the seatback 46 provides lateral support to the occupant of the vehicle seating assembly 10 during vehicle maneuvers and the bolster insert 22 prevents premature wear to the trim cover 38 and the foam layer 34. It is contemplated that the bolster insert 22 can be provided on either the inboard or outboard side of the seatback 46. Alternatively, the bolster insert 22 can be provided on both the inboard and outboard of the seatback 46.

Figure 3:
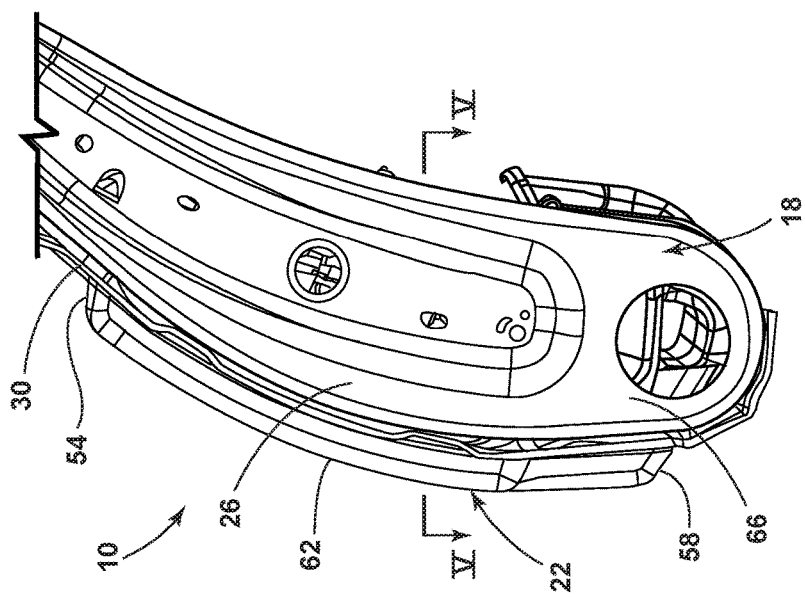
FIG. 3 is a side view of a seatback frame having the bolster insert.

Referring to FIG. 3, the bolster insert 22 can be operably coupled to the seatback frame 18 by at least one fastener, in a snap-fit manner, or integrally formed with the seatback frame 18. Additionally, the bolster insert 22 can be removable from the seatback frame 18. The removable nature of the bolster insert 22 enables repair or replacement of the bolster insert 22. The bolster insert 22 is made of an abrasion resistant material, such as a polymer, a plastic, metal, carbon fiber, or any other suitable abrasion resistant material. The degree to which a material resists abrasion is defined as the number of abrasion-imparting events the material can undergo before the material is worn through or generates a hole (e.g. ingress-egress cycles), which can be referred to as an abrasion rate. The abrasion resistant material utilized herein can be configured to withstand at least 50,000, at least 75,000, or at least 100,000 ingress-egress cycles prior to the abrasion resistant material wearing through or generating a hole. Further, the abrasion resistant material can have an abrasion rate that is at least equivalent to the abrasion rate of duck canvas, Kevlar®, and/or glass-filled composite plastics. The shape of the bolster insert 22 generally follows the contour of the seatback frame 18. The bolster insert 22 can include a top sloping side 54 and a bottom sloping side 58. A front side 62 of the bolster insert 22 can be generally arcuate and spans between the top sloping side 54 and the bottom sloping side 58. The bolster insert 22 can extend over at least one of the front surface 30, an inner surface 64 (FIG. 4), and a side surface 66 of the seatback frame 18.

Referring again to FIG. 3, the generally arcuate nature of the front side 62 of the bolster insert 22 can provide several advantages. For example, the arcuate shape of the front side 62 results in the bolster insert 22 sloping away from the occupant of the vehicle seating assembly 10. By sloping away from the occupant of the vehicle seating assembly 10 greater clearance is provided to the components held on the utility belt worn by the occupant, which presents a decreased pressure to the components of the utility belt thereby decreasing pressure felt by the occupant. Additionally, the sloped nature of the bolster insert 22 can improve the ease with which the occupant enters and exits the vehicle. Further, the bolster insert 22 again slopes away from the occupant near the bottom sloping side 58. In addition to the benefits described above the sloping away from the occupant near the bottom sloping side 58 can provide clearance for the seat 42 (FIG. 1) and maintain other functionalities of the vehicle seating assembly 10 (e.g. forward dumping of the seatback 46).

Figure 4:
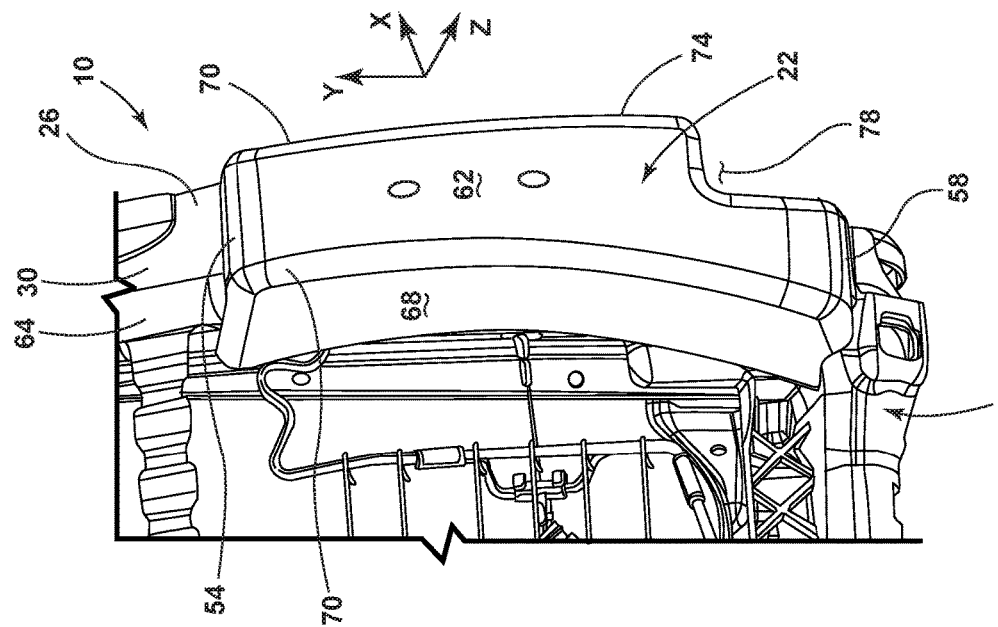
FIG. 4 is a front perspective view of the seatback frame having the bolster insert.
Figure 5:
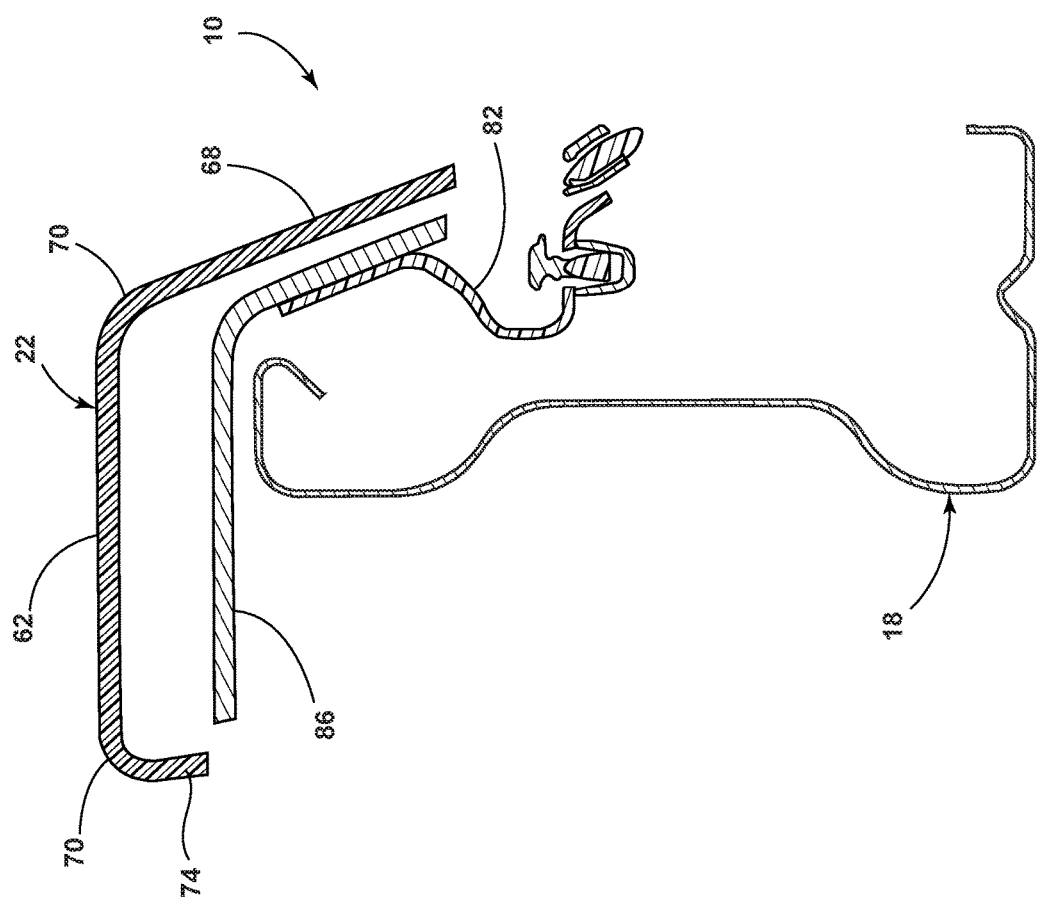
FIG. 5 is a cross-sectional view, taken at line V-V of FIG. 3, of the seatback frame having the bolster insert.
Figure 6:
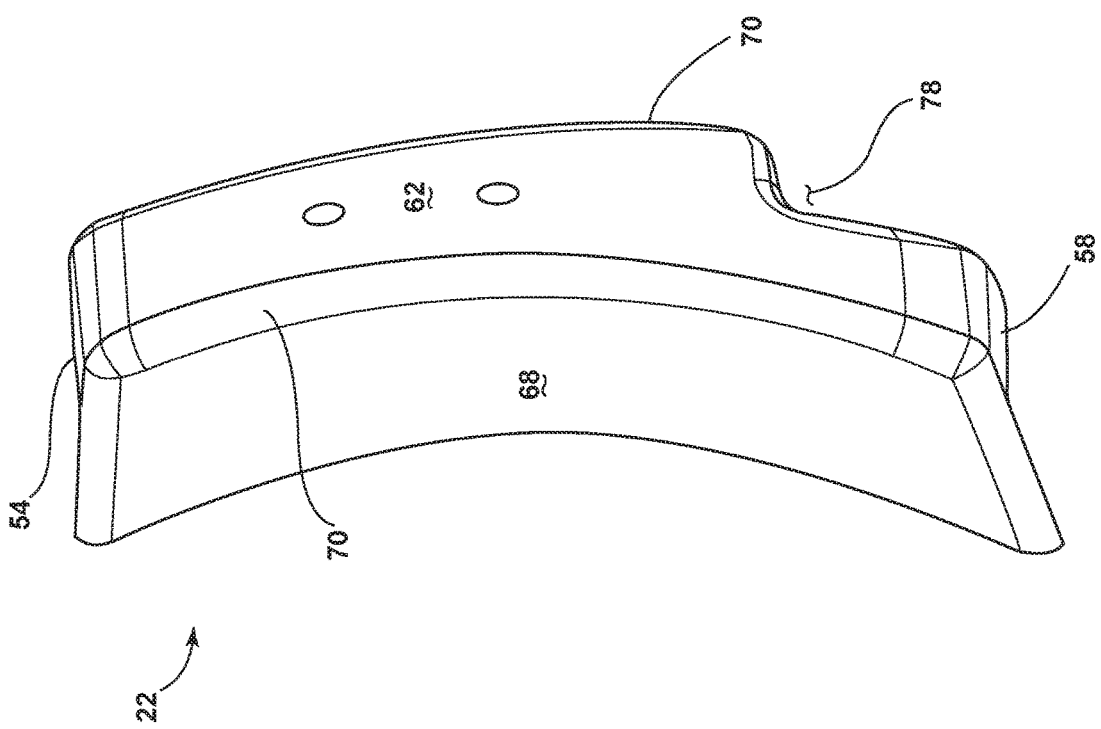
FIG. 6 is a front perspective view of the bolster insert.

Referring now to FIGS. 4-6, the bolster insert 22 further includes a left side 68 that is generally arcuate that transitions to the front side 62 through a rounded bezel 70. A right side 74 of the bolster insert 22 similarly transitions to the front side 62 through a rounded bezel 70. The rounded bezels 70 decrease the likelihood of a component of the utility belt becoming snagged or caught on the bolster insert 22. The rounded bezels 70 are particularly beneficial for vehicle seating assemblies 10 utilized by police officers. In the event that the police officer must enter or exit the vehicle quickly, a snagged or caught component of the utility belt could be detrimental to the police officer, the general public, and/or the duties that the police officer is discharging. Additionally, the right side 74 includes a notched section 78 that generally permits passage and/or operation of other components of the vehicle seating assembly 10 (e.g. recliner heart, seatbelt assembly, etc.). The top of the bolster insert 22 terminates in the top sloping side 54. Similarly, the bottom side of the bolster insert 22 terminates in the bottom sloping side 58. The left side 68 is generally arcuate or crescent shaped in the Y-Z plane of the seatback frame 18. Additionally, the left side 68 is arcuate in the X-Z plane of the seatback frame 18. The bolster insert 22 is generally sized and dimensioned to compliment the seatback frame 18 to ensure that the bolster insert 22 when installed on the vehicle seating assembly 10 does not interfere with other components or functionalities of the vehicle seating assembly 10.

Referring again to FIG. 5, the seatback frame 18 further includes a seatback bracket 82 and a seatback carrier 86. The seatback carrier 86 can be operably coupled to the seatback bracket 82 and/or the seatback frame 18. The bolster insert 22 can be sized and dimensioned to engage with the seatback carrier 86. The left side 68 of the bolster insert 22 generally follows the contour of an inward portion of the seatback carrier 86. The front side 62 of the bolster insert 22 can be parallel to a forward portion of the seatback carrier 86. The front side 62 of the bolster insert 22 can be longer than the forward portion of the seatback carrier 86 such that adequate clearance is provided for the right side 74 of the bolster insert 22 to extend along an outward edge of the seatback carrier 86.

Utility belts worn by occupants of vehicle seating assemblies 10 can cause premature wear to the vehicle seating assembly 10. More specifically, the premature wear can be imparted onto the trim cover 38 and foam layer 34 of the vehicle seating assembly 10. Occupants that wear utility belts may include police officers, construction workers, and contractors, to name a few. The features and concepts disclosed herein prevent premature wear to the trim cover 38 and foam layer 34 by providing the abrasion resistant bolster insert 22. Rather than having a conventional side bolster 26 at the lower portion of the seatback 46, the foam layer 34 and the trim cover 38 have been removed to expose the seatback frame 18. The removal of the foam layer 34 and the trim cover 38 present a less contoured lumbar region to the occupant of the vehicle seating assembly 10. Additionally, the exposure of the seatback frame 18 permits direct and removable coupling of the bolster insert 22 to the seatback frame 18.

The bolster insert 22 receives the majority of abrasion-imparting events. An abrasion-imparting event can arise when contact is made between the vehicle seating assembly 10 and a component held within the utility belt. The ingress and egress of the occupant wearing the utility belt can provide increased pressure between the vehicle seating assembly 10 and the components of the utility belt. During ingress and egress, the bolster insert 22 receives the majority of the force of the abrasion-imparting event. The removable, serviceable, and replaceable nature of the bolster insert 22 allows for utilization of the vehicle seating assembly 10 for longer periods of time. In other words, without the bolster insert 22 the trim cover 38 and/or the foam layer 34 on a conventional side bolster 26 would need to be replaced sooner than if the bolster insert 22 had been implemented.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
   a seatback frame; and
   a bolster insert in direct physical contact with, and extending over, at least one of a front surface and an inner surface of the seatback frame, the bolster insert presenting a generally continuous surface to an occupant, and a foam layer and a trim cover contoured to expose the bolster insert when fully assembled.

2. The vehicle seating assembly of claim 1, wherein the bolster insert is operably coupled to the seatback frame in a snap-fit manner.

3. The vehicle seating assembly of claim 1, wherein the bolster insert is operably coupled to the seatback frame by at least one fastener.

4. The vehicle seating assembly of claim 1, wherein the bolster insert is removable.

5. The vehicle seating assembly of claim 1, wherein the bolster insert is made of an abrasion resistant material.

6. The vehicle seating assembly of claim 5, wherein the abrasion resistant material is plastic.

7. A vehicle seating assembly comprising:
a seatback frame;
a bolster insert in direct physical contact with the seatback frame;
a foam layer and a trim cover that are contoured to expose the bolster insert when fully assembled.

8. The vehicle seating assembly of claim 7, wherein the bolster insert is operably coupled to the seatback frame in a snap-fit manner.

9. The vehicle seating assembly of claim 7, wherein the bolster insert is operably coupled to the seatback frame by at least one fastener.

10. The vehicle seating assembly of claim 7, wherein the bolster insert is removable.

11. The vehicle seating assembly of claim 7, wherein the bolster insert is made of an abrasion resistant material.

12. The vehicle seating assembly of claim 11, wherein the abrasion resistant material is a polymer.

13. A vehicle seating assembly comprising:
a foam layer and a trim cover contoured to expose a bolster insert when fully assembled, the bolster insert positioned on a seatback frame.

14. The vehicle seating assembly of claim 13, wherein the bolster insert extends over at least one of an inner surface, a front surface, and a side surface of the seatback frame.

15. The vehicle seating assembly of claim 13, wherein the bolster insert further comprises:
a front side and a left side, wherein the front side and the left side are each generally arcuate in shape.

16. The vehicle seating assembly of claim 13, wherein the bolster insert is operably coupled to the seatback frame in a snap-fit manner.

17. The vehicle seating assembly of claim 13, wherein the bolster insert is operably coupled to the seatback frame by at least one fastener.

18. The vehicle seating assembly of claim 13, wherein the bolster insert is removable.

19. The vehicle seating assembly of claim 13, wherein the bolster insert is made of an abrasion resistant material.

20. The vehicle seating assembly of claim 19, wherein the abrasion resistant material is carbon fiber.

\* \* \* \* \*